(12) United States Patent
Tanaka et al.

(10) Patent No.: US 12,210,231 B2
(45) Date of Patent: Jan. 28, 2025

(54) OPTICAL MODULE AND MANUFACTURING METHOD OF OPTICAL MODULE FOR OPTICAL COMMUNICATION

(71) Applicant: Sumitomo Electric Industries, Ltd., Osaka (JP)

(72) Inventors: Keiji Tanaka, Osaka (JP); Hiroshi Uemura, Osaka (JP); Taichi Misawa, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 212 days.

(21) Appl. No.: 18/085,634

(22) Filed: Dec. 21, 2022

(65) Prior Publication Data

US 2023/0194905 A1   Jun. 22, 2023

(51) Int. Cl.
*G02F 1/01* (2006.01)
*G02F 1/21* (2006.01)

(52) U.S. Cl.
CPC .......... *G02F 1/0121* (2013.01); *G02F 1/0102* (2013.01); *G02F 1/212* (2021.01)

(58) Field of Classification Search
CPC ............................... G02F 1/212; G02F 1/0102
USPC ......................................................... 359/245
See application file for complete search history.

(56) References Cited

U.S. PATENT DOCUMENTS

| 10,025,047 | B1 | 7/2018 | Liu et al. |
| 2018/0180808 | A1 | 6/2018 | Zhang et al. |
| 2019/0259676 | A1 | 8/2019 | Dresser |

FOREIGN PATENT DOCUMENTS

WO   2020/173561 A1   9/2020

*Primary Examiner* — William Choi
(74) *Attorney, Agent, or Firm* — McCarter & English, LLP; Michael A. Sartori

(57) ABSTRACT

According to one embodiment, an optical module includes: a lid having a first face and a second face, the lid including a bump, a wiring, and a through via; an optical circuit element; a first integrated circuit (IC); a first block bonded to the first IC by a first adhesive; a temperature control element bonded to the optical circuit element; and a housing having an opening and a third face provided inside the opening, the housing being configured to house the first IC, the optical circuit element, the first block, and the temperature control element, the third face being bonded to the first block and the temperature control element by a second adhesive, the housing being hermetically sealed with the lid.

8 Claims, 11 Drawing Sheets

OPTICAL MODULE AND MANUFACTURING METHOD OF OPTICAL MODULE FOR OPTICAL COMMUNICATION

CROSS-REFERENCE TO RELATED APPLICATION

This application claims priority from Japanese Patent Application No. 2021-208394, filed on Dec. 22, 2021, the entire subject matter of which is incorporated herein by reference.

TECHNICAL FIELD

The present disclosure relates to an optical module for optical communication and a method of manufacturing the optical module.

BACKGROUND

International Publication WO 2020/173561 describes an optical module including an optical integrated circuit, an electronic integrated circuit, and a mold board in which the optical integrated circuit and the electronic integrated circuit are buried. The mold board has a first redistribution layer disposed on the first surface and a second redistribution layer disposed on the second surface. The first redistribution layer has openings for connecting optical fibers to the optical integrated circuit. The second redistribution layer has a BGA (Ball Grid Array). The first redistribution layer and the second redistribution layer are connected to each other through electrical wiring.

U.S. patent Ser. No. 10/025,047 describes an integrated housing configuration including a circuit board, an electronic IC, an optical IC, a carrier, and a BGA. The electronic IC is connected to the optical IC and the circuit board. The carrier has a redistribution layer. The carrier, the electronic IC, and the optical IC are integrated by POP (Package On Package). The carrier is made of a molding material. The carrier encloses the electronic IC and the optical IC. The electronic IC is physically connected to the redistribution layer. The electronic IC is connected to the circuit substrate through the redistribution layers, a through mold via (TMV), and the BGA.

U.S. Patent Application Publication No. 2018/0180808 describes an optoelectronic module including an optical chip and a mold board. The optical chip is buried in the mold board, and the surface of the optical chip is exposed. The mold board has a TMV. An IC chip is mounted on the mold board by flip-chip assembly. The IC chip is electrically connected with the optical chip and TMV. An optical connector having an optical waveguide is mounted on the mold board by flip-chip assembly, and the optical connector is optically coupled to the optical chip.

U.S. Patent Application Publication No. 2019/0259676 describes a chip-scale surface mount housing including a board, a lid, a seal ring, and an MMIC (Monolithic Microwave Integrated Circuit). The MMIC is mounted on the board inside the cavity of the lid. The lid has an electromagnetic shield and through-vias. The board has through-substrate vias and solder balls. The seal ring attaches the lid to the board. The electromagnetic shield is connected to the MMIC through the through-via.

SUMMARY

An optical module according to the present disclosure includes: a lid having a first face and a second face opposite to the first face, the lid including a bump, a wiring, and a through via, the bump being formed on the first face, the wiring being formed on the second face, the through via being configured to electrically connect the first face to the second face; an optical circuit element mounted on the second face by flip-chip assembly; a first integrated circuit (IC) mounted on the second face by flip-chip assembly, the first IC being electrically connected to the optical circuit element through the wiring and electrically connected to the bump through the through via; a first block bonded to the first IC by a first adhesive; a temperature control element bonded to the optical circuit element; and a housing having an opening and a third face provided inside the opening, the housing being configured to house the first IC, the optical circuit element, the first block, and the temperature control element, the third face being bonded to the first block and the temperature control element by a second adhesive, the housing being hermetically sealed with the lid.

A manufacturing method of an optical module according to the present disclosure includes: preparing a lid having a bump formed on a first face, a wiring formed on a second face opposite to the first face, a through via being configured to electrically connect the first face to the second face; bonding a first integrated circuit (IC) to a first block by a first adhesive; mounting an optical circuit element to a temperature control element; mounting the first IC and the temperature control element on the second face by flip-chip assembly, electrically connecting the first IC to the optical circuit element through the wiring, and electrically connecting the first IC to the bump through the through via; applying the second adhesive on the second face provided inside an opening of a housing; holding the first block, the first IC, the temperature control element, and the optical circuit element inside the opening, and bonding the third face of the housing to the first block and the temperature control element by the second adhesive; and hermetically sealing the housing with the lid.

DETAILED DESCRIPTION

Figure 1:
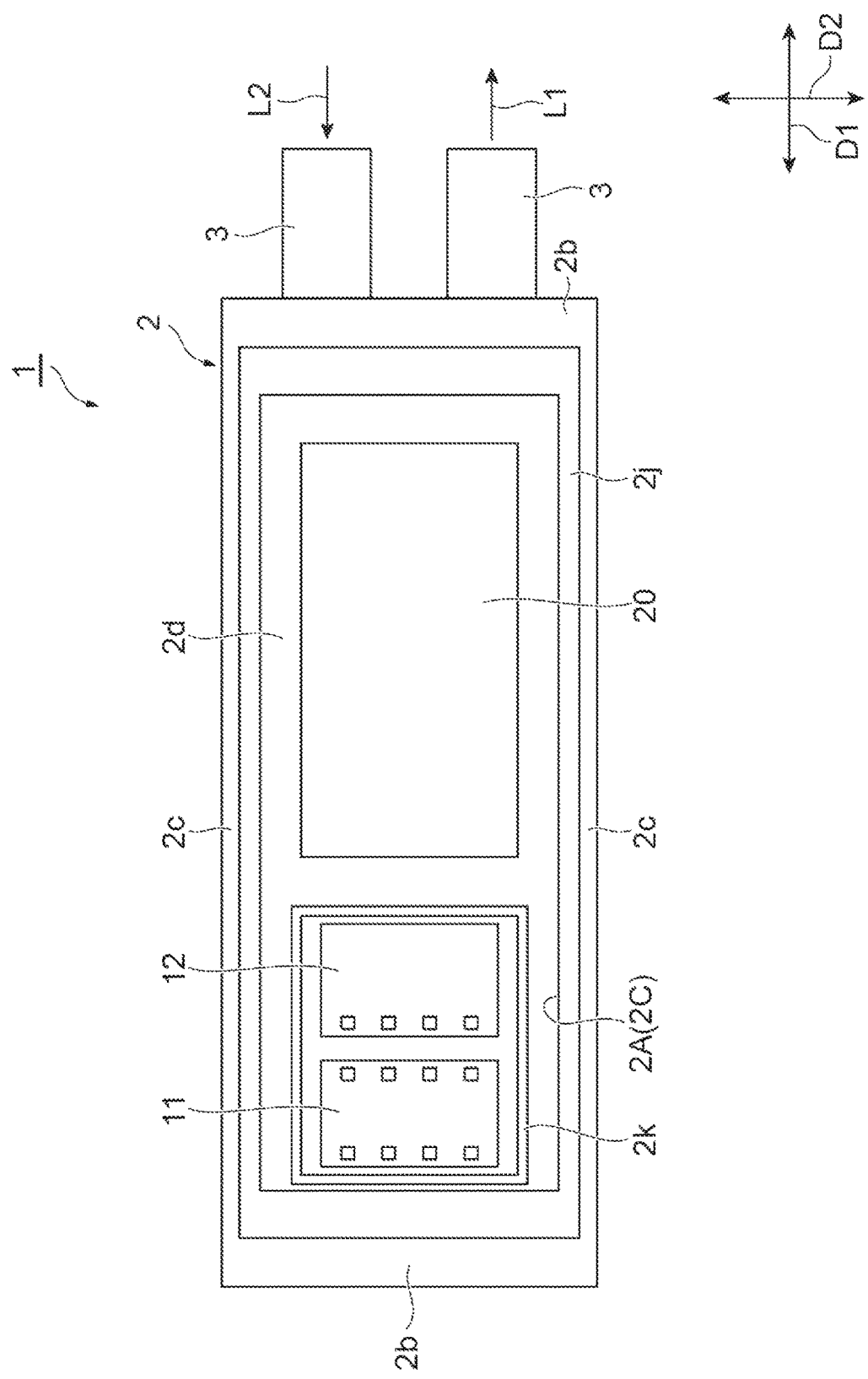
FIG. 1 is a plan view illustrating a structure of an optical module according to an embodiment.

Specific examples of an optical module and a method of manufacturing the optical module according to an embodiment of the present disclosure will be described below with reference to the drawings. It is noted that the present invention is not limited to the following examples, but is intended to include all modifications indicated in the scope of claims and included within the scope of equivalents to the scope of claims. In the description of the drawings, the same or corresponding elements are denoted by the same reference numerals, and redundant descriptions are omitted as appropriate. In addition, the drawings may be partially simplified or exaggerated for easy understanding, and the dimensional ratios and the like are not limited to those described in the drawings.

Figure 2:
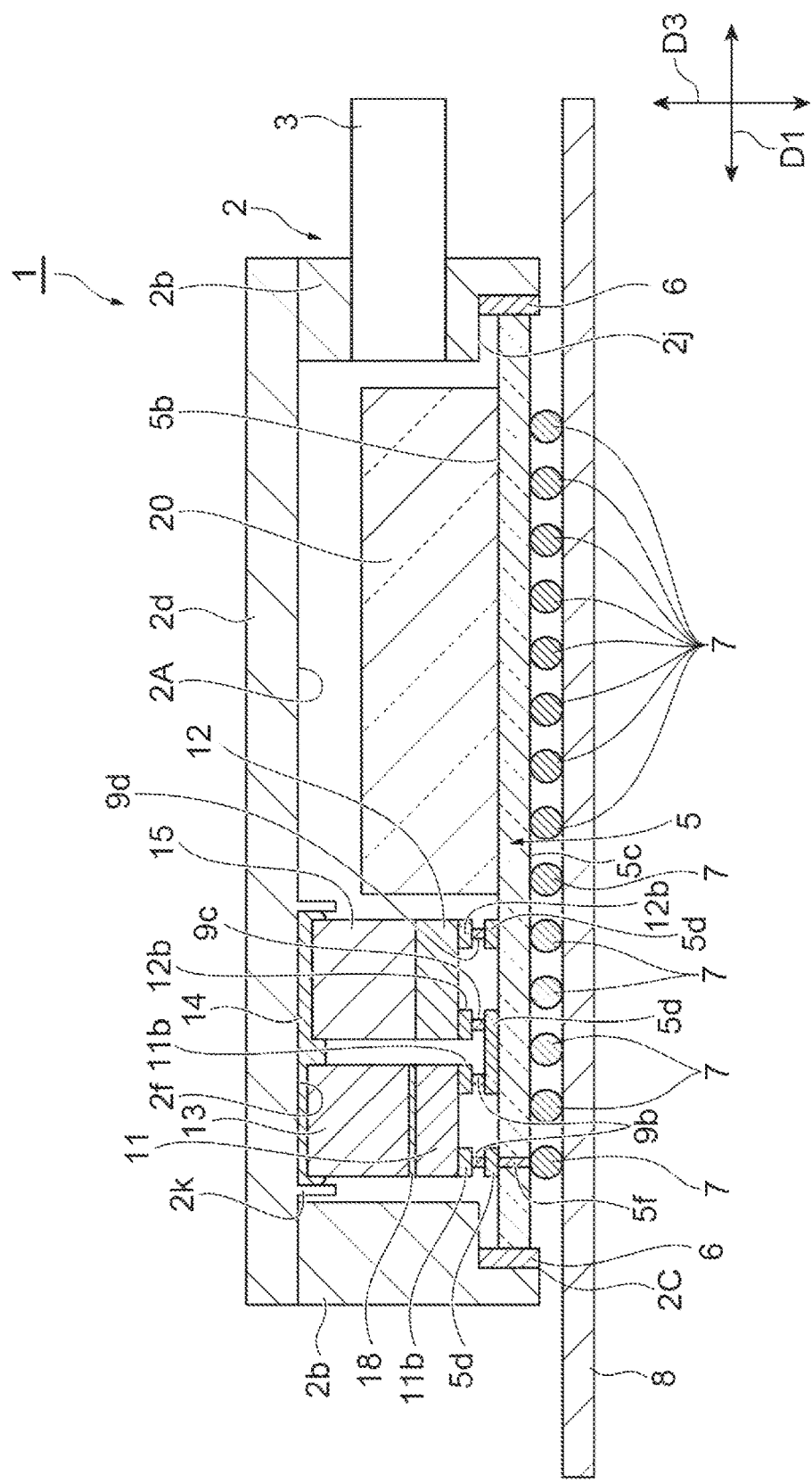
FIG. 2 is a longitudinal sectional view of the optical module according to the embodiment.

FIG. 1 is a plan view illustrating a structure of an optical module 1 according to the embodiment. FIG. 2 is a longitudinal sectional view illustrating the optical module 1. As illustrated in FIGS. 1 and 2, the optical module 1 is, for example, an optical transmitter module (TOSA: Transmitter Optical Sub Assembly) including a rectangular parallelepiped housing 2 and an optical connector (sleeve) 3. At least one of, for example, a ceramic, a glass, and a metal is used as a hermetic material of the housing 2. The housing 2 extends in a direction D1 that is a longitudinal direction of the housing 2, a direction D2 that is a width direction of the housing 2, and a direction D3 that is a height direction of the housing 2. For example, the direction D1, the direction D2, and the direction D3 are perpendicular to each other. For example, the length of the housing 2 in the direction D1 is larger than the length of the housing 2 in the direction D2 and is larger than the length of the housing 2 in the direction D3. It is noted that, in the direction D3, the direction in which a lid 5 is provided with respect to a heat radiation plate 2d may be referred to as down, lower side, or downward, and the direction opposite to down, lower side, or downward may be referred to as up, upper side, or upward.

The housing 2 includes a pair of first side walls 2b located at the ends in the direction D1, a pair of second side walls 2c located at the ends in the direction D2, and a heat radiation plate 2d (heat radiation member) located at one end in the direction D3. The opposite side of the heat radiation plate 2d of the housing 2 is open to the outside, and the opening is covered with a lid 5 described later. The optical connector 3 is provided, for example, on one of the pair of first side walls 2b. The optical connector 3 penetrates the first side wall 2b. The optical connector 3 includes an optical waveguide for inputting and outputting optical signals between the inside and the outside of the housing 2. The heat radiation plate 2d is made of, for example, copper tungsten (CuW). The heat radiation plate 2d may be made of, for example, a metal material other than CuW or a ceramic such as aluminum nitride (AlN). An internal space 2A is defined inside the housing 2 by the pair of first side walls 2b, the pair of second side walls 2c, and the heat radiation plate 2d. The internal space 2A is a region surrounded by the pair of first side walls 2b, the pair of second side walls 2c, and the heat radiation plate 2d. Components of the optical module 1 are accommodated in the internal space 2A. The optical module 1 further includes a lid 5 and a sealing material 6 that seal the internal space 2A. The lid 5 is made of, for example, a material transmitting visible light. As an example, the base material of the lid 5 contains glass. The base material of the lid 5 may be, for example, a glass ceramic or an alumino silicate glass in which glass components are partially crystallized. It is preferable that the linear expansion coefficient of the lid 5 is adjusted according to the linear expansion coefficient of the components mounted on the lid 5. For example, silicon semiconductors and indium phosphide (InP) compound semiconductors have linear expansion coefficients of 3.0 ppm/° C. and 4.5 ppm/° C., respectively. The temperature of an optical modulator 12 made of, for example, an InP compound semiconductor is maintained to be constant by a TEC 15. For example, the TEC 15 is controlled by a control circuit so that the temperature of the face (temperature control face) bonded to the optical circuit element 12 is maintained to be a predetermined temperature. The optical circuit element 12 is an optical modulator configured with, for example, a Mach-Zehnder modulator. For example, when an external temperature of the optical module 1 is higher than a predetermined temperature, the optical modulator 12 is cooled, and when the external temperature is lower than a predetermined temperature, the optical modulator 12 is heated. Therefore, in that case, in consideration that the optical modulator 12 does not expand or contract due to the change in external temperature, it is preferable that the lid 5 has a linear expansion coefficient in a range of 0 to 4.5 ppm/° C. In addition, it is preferable that the lid 5 maintains hermeticity against the change in temperature. Accordingly, for example, a stress on the bump connection described later, due to the change in temperature of the housing 2 can be alleviated. A more stable bump connection can be constructed by alleviating the stress.

FIG. 1 illustrates the internal space 2A of the housing 2 with the lid 5 and the sealing material 6 omitted, when viewed from above in the direction D3. The internal space 2A is formed inside an opening 2C of the housing 2. A driver IC 11 (first IC), an optical modulator 12, and an optical component 20 are provided in the opening 2C. The driver IC 11 sandwiches a first block 13 and a second adhesive 14 with the heat radiation plate 2d (heat radiation member) in the direction D3 (refer to FIG. 2). The first block 13 is adhered to a third face 2f of the housing 2 by the second adhesive 14. For example, the third face 2f is formed on the heat radiation plate 2d. The third face 2f of the housing 2 is, for example, a face facing the internal space 2A of the heat radiation plate 2d. The third face 2f of the housing 2 is provided so as to include a region to which the first block 13 is adhered. The driver IC 11 is adhered to the first block 13 by the first adhesive 18. Therefore, by fixing the driver IC 11 to the first block 13 by the first adhesive 18 and fixing the first block 13 to the third face 2f of the housing 2 by the second adhesive 14, the driver IC 11 is fixed to the third face 2f of the housing 2. The cured second adhesive 14 has a thickness in direction D3 that is larger than a thickness of the cured first adhesive 18.

The first adhesive 18 and the second adhesive 14 are, for example, conductive adhesives. The conductive adhesive is, for example, a silver paste. The first adhesive 18 and the second adhesive 14 are applied in an uncured state, and when heated and cured, a bonded state is formed. The first adhesive 18 and the second adhesive 14 are, for example, in a paste state when applied, but are in a cured state by heating or a passage of time. It is preferable that the first adhesive 18 and the second adhesive 14 have good thermal conductivity. The thermal conductivity in the cured state thereof is, for example, preferably 1 W/(m·K) or more, more preferably 10 W/(m·K) or more. Accordingly, the heat resistance of the second adhesive 14 is suppressed to be low, and heat is efficiently radiated to the heat radiation plate 2d through the first block 13, the temperature rise of the driver IC 11 can be suppressed because of the efficient heat radiation. As a result, the operation temperature of the driver IC 11 can be prevented from exceeding the allowable range, and performance deterioration can be suppressed. The first adhesive 18 and the second adhesive 14 may be conductive adhesives being thermally conductive and electrically conductive other than silver paste. As the first adhesive 18 and the second adhesive 14, for example, adhesives containing metal particles or ceramic fillers, silicone-based adhesives, pastes containing metal nanoparticles such as gold, silver, and copper, gold-tin alloy pastes, or solder pastes (cream solders) may be used. The first adhesive 18 and the second adhesive 14 may be formed by using different materials. The optical modulator 12 sandwiches the TEC (Thermo Electric Cooler) 15, which is a temperature control element, and the second adhesive 14 between the optical modulator 12 and the heat radiation plate 2d in the direction D3. The TEC 15 is adhered to the third face 2f of the housing 2 by the second adhesive 14. The housing 2 has an enclosure 2k protruding from the third face 2f along the direction D3. The enclosure 2k is formed so as to surround the driver IC 11 and the optical modulator 12 when the heat radiation plate 2d of the housing 2 is viewed along the direction D3. For example, the enclosure 2k has a rectangular frame shape when viewed along the direction D3. The cured second adhesive 14 is formed on the inside of the enclosure 2k when viewed along the direction D3.

For example, the optical component 20 includes at least one of lenses, mirrors, beam splitters, and optical filters. The optical component 20 inputs and outputs the optical signals to and from the optical modulator 12. The optical connector 3 is provided on one of the pair of first side walls 2b. The optical connector 3 inputs and outputs the optical signals to and from the optical component 20. The optical component 20 is optically coupled with the optical connector 3. The optical module 1 has, for example, two optical connectors 3 aligned along the direction D2. The optical connector 3 is, for example, a cylindrical sleeve that holds the optical fiber in the center. The end face of the optical fiber is exposed to the internal space 2A. In one of the two optical connectors 3, a local light L2 is input into the internal space 2A of the optical module 1 from the outside of the optical module 1. In the other of the two optical connectors 3, a signal light L1 outside the optical module 1 is output from the inside of the optical module 1 to the outside of the housing 2. The optical component 20 inputs and outputs the signal light L1 and the local light L2 to and from the optical connector 3 and the optical modulator 12. For example, the local light L2 is input from the outside of the housing 2 to the optical modulator 12 through the optical connector 3 and the optical component 20, and the optical transmission signal generated by the optical modulator 12 is output to the outside through the optical component 20 and the optical connector 3. It is noted that, with respect to the directions, sometimes, the direction in which the signal light L1 is output from the optical connector 3 to the outside of the housing 2 may be referred to as front, front side, or forward, and the direction opposite to front, front side, or forward may be referred to as back, back side, or backward. For example, the local light L2 output from the optical connector 3 to back, back side, or backward is input to the optical component 20 from the outside of the housing 2. In addition, for example, the pair of first side walls 2b has a front-side first side wall and a back-side first side wall in the direction D1. The optical connector 3 is provided on the front-side first side wall.

However, these directions are for the convenience of description and do not limit the directions in which the components are arranged.

The optical module 1 further includes a plurality of conductive bumps (first bumps) 7 fixed to the lid 5. The bumps 7 constitute, for example, a BGA (Ball Grid array) in which the plurality of bumps 7 are two-dimensionally arranged along the direction D1 and the direction D2. The lid 5 is electrically connected to an external circuit board 8 by the bumps 7. It is noted that the optical module 1 is fixed to the circuit board 8 by connecting the bumps 7. The driver IC 11 and the optical modulator 12 are arranged along the direction D1. For example, in the direction D1, the optical modulator 12 is arranged between the driver IC 11 and the optical connector 3. The driver IC 11, the lid 5, and the bumps 7 are arranged in this order along direction D3. The lid 5 has a first face 5c to which the bumps 7 are fixed and a second face 5b which faces the internal space 2A. The first face 5c is exposed to the outside of the housing 2. The driver IC 11 and the optical modulator 12 are mounted on the second face 5b by flip-chip assembly. That is, in the lid 5, the second face 5b is a face opposite to the first face 5c. For example, the optical component 20 is mounted on the second face 5b, and the optical modulator 12 is optically coupled with the optical component 20. For example, in the directions D3 and D2, the optical axis of light input to and output from the optical modulator 12 coincides with the optical axis of light input to and output from the optical modulator 12 by the optical component 20. The lid 5 has a plurality of wirings 5d formed on the second face 5b. The driver IC 11 has a plurality of wirings 11b and bumps 9b facing the lid 5. Hereinafter, in some cases, the face on which the plurality of wirings 11b and the bumps 9b are formed is referred to as a circuit face (first circuit face), and the face opposite to the circuit face (first circuit face) is referred to as a board face (first board face). The circuit face of the driver IC 11 is connected to the second face 5b of the lid 5 by flip-chip assembly. More specifically, some of the plurality of wirings 5d and the wirings 11b are electrically connected to each other through the bumps 9b. It is noted that, more specifically, a pad may be formed in each of the wirings 5d and 11b to which the bumps 9 are connected. For example, wirings other than pads may be covered with a protective film (insulating film), and the pads may be exposed from the protective film. Herein, the bumps 7 are projecting-shape metals for obtaining the electrical connection between two wirings and may be, for example, solder balls, C4 bumps (solder bumps), gold bumps, silver bumps, copper bumps, or indium bumps. The solder ball is a bump made of a solder and is one form of a bump.

The optical modulator 12 has wirings 12b and bumps (second bumps) 9c facing the lid 5. Hereinafter, in some cases, the face on which the plurality of wirings 12b and the bumps 9c are formed is referred to as a circuit face (second circuit face), and the face opposite to the circuit face (second circuit face) is referred to as a board face (second board face). The circuit face of the optical modulator 12 is connected to the second face 5b of the lid 5 by flip-chip assembly. More specifically, the wirings 5d and the wirings 12b are electrically connected to each other through the bumps 9c. For example, the wirings 5d, the bumps (second bumps) 9b and 9c, and the wirings 11b and the wirings 12b constitute signal wirings for transmitting electrical signals. The bumps 9b and 9c are gold stud bumps made of, for example, gold (Au). It is noted that, in some case, a portion of the wirings 12b to which the bumps 9c are connected may be referred to as a pad. For example, the wirings 12b of a portion of other than the pads may be covered with the protective film (insulating film), and the pads may be exposed from the protective film. The optical modulator 12 may further have dummy bumps 9d (refer to FIG. 2). The dummy bumps 9d connect, for example, pads formed on the optical modulator 12 and pads formed on the lid 5. The dummy bumps including pads connected with the dummy bumps are sometimes called dummy bumps. The dummy bumps 9d are formed to reinforce the mechanical strength of the connection between the optical modulator 12 and the lid 5 and do not contribute to signal transmission. For example, the dummy bumps 9d are connected to the ground potential or are electrically floated. The lid 5 is, for example, a glass board attached with fine holes (TGV: Through Glass Vias). That is, the lid 5 has a through-via (TGV) 5f, and the wirings 5d of the lid 5 is electrically connected to the bumps 7 fixed to the first face 5c through the through-via 5E The bumps 7 are electrically connected to, for example, the circuit board 8. The connection through the bumps 7 allows the electrical signals to be supplied from the circuit board 8 to the wirings 5d of the lid 5 with a relatively short wiring length.

The electrical signal is supplied to the lid 5 from the first face 5c of the lid 5 through the bumps 7, and the electrical signal is supplied to the driver IC 11 through the lid 5 and the bumps 9b. The electrical signals may include, for example, the relatively low-speed electrical signals of several Mbps or less and the high-speed electrical signals generating optical signals of 10 Gbps or more. The driver IC 11 supplies the high-speed electrical signals to the optical modulator 12 through the bumps 9b, the wirings 5d, and the bumps 9c. More specifically, a transmission line is formed on the second face 5b of the lid 5 by, for example, the wirings 5d. For example, the transmission line is configured as a coplanar line with four parallel wirings (GSSG wirings) extending along the direction D1. The GSSG wiring is configured with a ground wiring (G), a signal wiring (S), a signal wiring (S), and a ground wiring (G) arranged along the direction D2. For example, a high-speed differential signal is transmitted from the driver IC 11 to the optical modulator 12 through two signal wirings S and S at the center. The voltage of the ground wiring G at both ends is set to the ground potential. By transmitting the high-speed electrical signal through the transmission line, the influence of the inductance of the signal wirings can be reduced, so that the frequency characteristics of the response of the optical signal to the electrical signal can be improved. It is preferable that the characteristic impedance of the transmission line formed by the wirings 5d is substantially equal to the characteristic impedance of the transmission line formed at the electrical signal output unit of the driver IC 11 and the electrical signal input unit of the optical modulator 12. For example, the characteristic impedance of the wirings 5d may be adjusted within a relative error range of ±10% of the characteristic impedances of the driver IC 11 and the optical modulator 12. Accordingly, signal reflection occurring at a connection portion of the transmission line between the electrical signal output unit of the driver IC 11 and the wirings 5d, and at a connection portion of the transmission line between the wirings 5d and the electrical signal input unit of the optical modulator 12 can be reduced, and thus, high-quality signal transmission up to higher frequencies can be achieved.

The wirings 5d constituting the transmission line may be configured with a single metal layer or may be configured with a plurality of metal layers stacked along the direction D3. For example, when the wirings 5d is configured with two or more metal layers, the insulating film insulating each metal layer may be formed between the each metal layer. It is noted that, when the wirings 5d is configured with two metal layers, the transmission line may be configured as, for example, a coplanar line with a ground layer. In the case, for example, the ground layer is formed in a layer (one of the two metal layers) close to the first face 5c of the lid 5, and the coplanar line layer described above is formed with a layer (the other of the two metal layers) far from the first face 5c of the lid 5. An insulating film is formed between the ground layer and the coplanar line layer. Therefore, the ground wirings (G) provided in the ground layer and the coplanar line layer may be electrically connected to each other through a through-hole provided in the insulating film.

That is, the ground layer is arranged between the coplanar wiring layer and the lid 5.

It is noted that, for simplification, only high-speed signal wirings are illustrated in the drawing. Similarly to the high-speed signal wirings, relatively low-speed electrical wirings of a power supply, a ground, control signals, and the like are electrically connected to the circuit board 8 through the lid 5 and the bumps 7. For example, the lid 5 is accommodated in a recess 2j formed at the end of the housing 2 opposite to the heat radiation plate 2d. The recess 2j defines an opening 2C of the housing 2. The recess 2j has, for example, a rectangular shape outside the internal space 2A when viewed along the direction D3. The sealing material 6 is sandwiched between the lid 5 accommodated in the recess 2j and the housing 2. The material of the sealing material 6 is not particularly limited, but is, for example, glass or solder.

Figure 3:
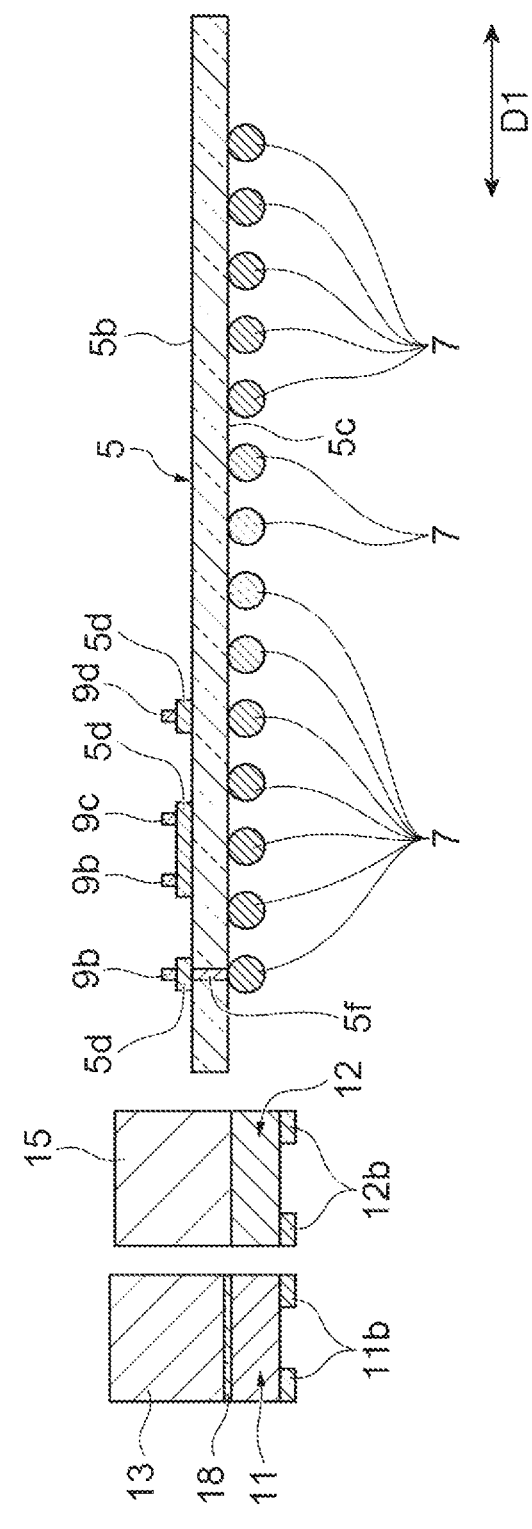
FIG. 3 is a view illustrating a process of a method of manufacturing the optical module according to the embodiment.

Next, a method of manufacturing an optical module according to the embodiment will be described. Hereinafter, a method of assembling the above-described optical module 1 will be described. First, as illustrated in FIG. 3, the driver IC 11 and the first block 13 are bonded to each other (the process of bonding the first IC to the first block). For example, the driver IC 11 is arranged on an assembly jig or the like (not illustrated) so that the circuit face faces downward, and the first block 13 is adhered to the board face by the first adhesive 18. Alternatively, the first block 13 may be arranged on an assembly jig or the like (not illustrated), the first adhesive 18 may be applied to the upper face, and the board face may be bonded to the first block 13 from above. The first adhesive 18 has fluidity in an uncured state, and is applied, for example, on the board face of the driver IC 11. After the first block 13 is pressed, the first adhesive 18 is cured by, for example, heating, and by curing, the driver IC 11 and the first block 13 are firmly bonded to each other. Then, the optical modulator 12 and the TEC 15 are bonded to each other (the process of bonding the optical modulator to the temperature control element). For example, the optical modulator 12 is arranged on an assembly jig or the like (not illustrated) so that the circuit face faces downward, and the TEC 15 is bonded to the board face. Alternatively, the TEC 15 may be arranged on an assembly jig or the like (not illustrated) so that the temperature control face faces upward, and the board face of the optical modulator 12 may be connected to the temperature control face from above. It is noted that the connection at this time may be solder connection using, for example, a gold-tin solder.

Figure 4:
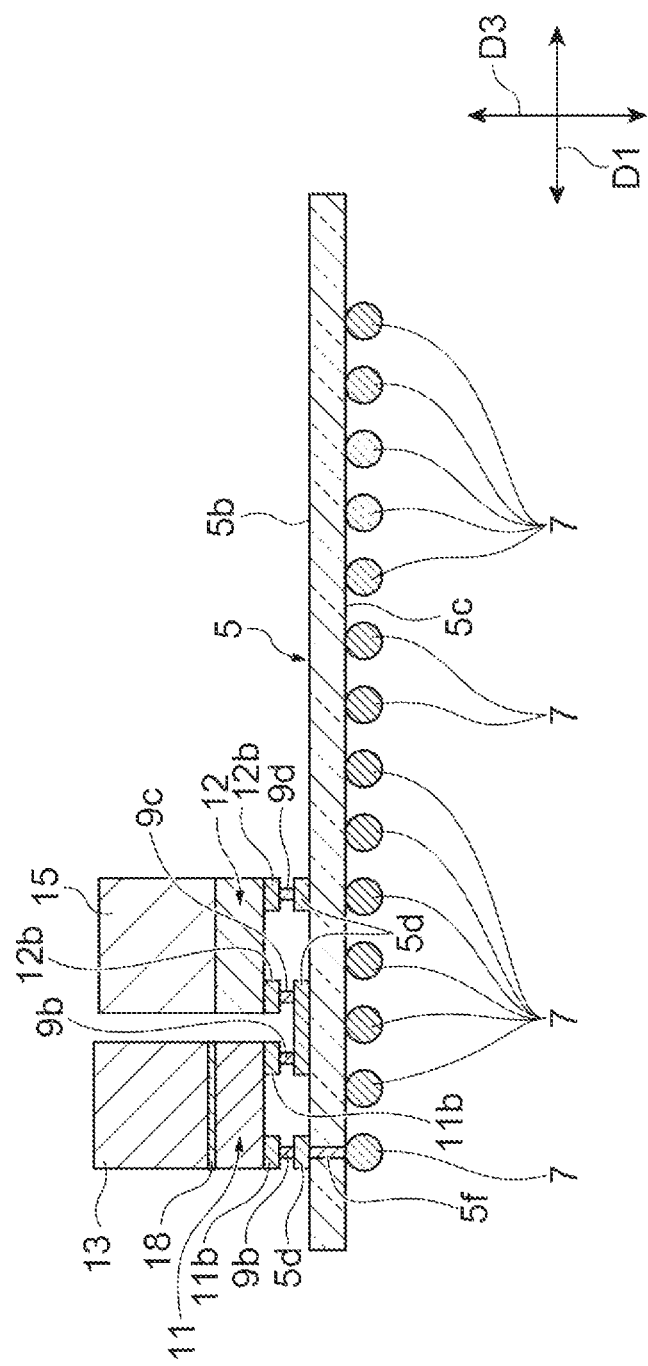
FIG. 4 is a view illustrating a process of the method of manufacturing the optical module according to the embodiment.

In addition, the wirings 5d on the second face 5b includes pads, the bumps 9b and 9c are formed on these pads (the process of forming bumps), and the lid 5 where the plurality of bumps 7 are fixed on the first face 5c of the lid 5 is prepared (the process of preparing the lid). Herein, the bumps 7 may be, for example, any one of the C4 bumps, the gold bumps, the silver bumps, the copper bumps, and the indium bumps, and may have a diameter smaller than a general-purpose solder ball diameter of 300 to 500 μm. As illustrated in FIG. 4, the driver IC 11 to which the first block 13 is bonded is connected to the second face 5b of the lid 5. Then, the optical modulator 12 to which the TEC 15 is bonded is connected to the second face 5b (the process of electrically connecting). Specifically, the driver IC 11 is mounted by flip-chip assembly on the lid 5 in which the bumps 9b are fixed to the pad of the wirings 5d. At this time, the pad of the wiring 11b of the driver IC 11 is bonded to the bumps 9b. In addition, the pads of the wirings 12b of the optical modulator 12 are bonded to the bumps 9c. It is noted that the bumps 9b may be formed on the pad of the wiring 11b of the driver IC 11 and bonded to the pad of the wirings 5d of the lid 5. In addition, the bumps 9c may be formed on the pads of the wirings 12b of the optical modulator 12 and bonded to the pads of the wirings 5d of the lid 5. The driver IC 11 is electrically connected to the optical modulator 12 through the bumps 9b, the wirings 5d, and the bumps 9c. Therefore, by forming the signal wirings, the electrical signal can be transmitted from the driver IC 11 to the optical modulator 12. In other words, the driver IC 11 and the optical modulator 12 are mounted on the second face 5b of the lid 5 by flip-chip assembly so as to form the signal wirings, in this manner.

Figure 5:
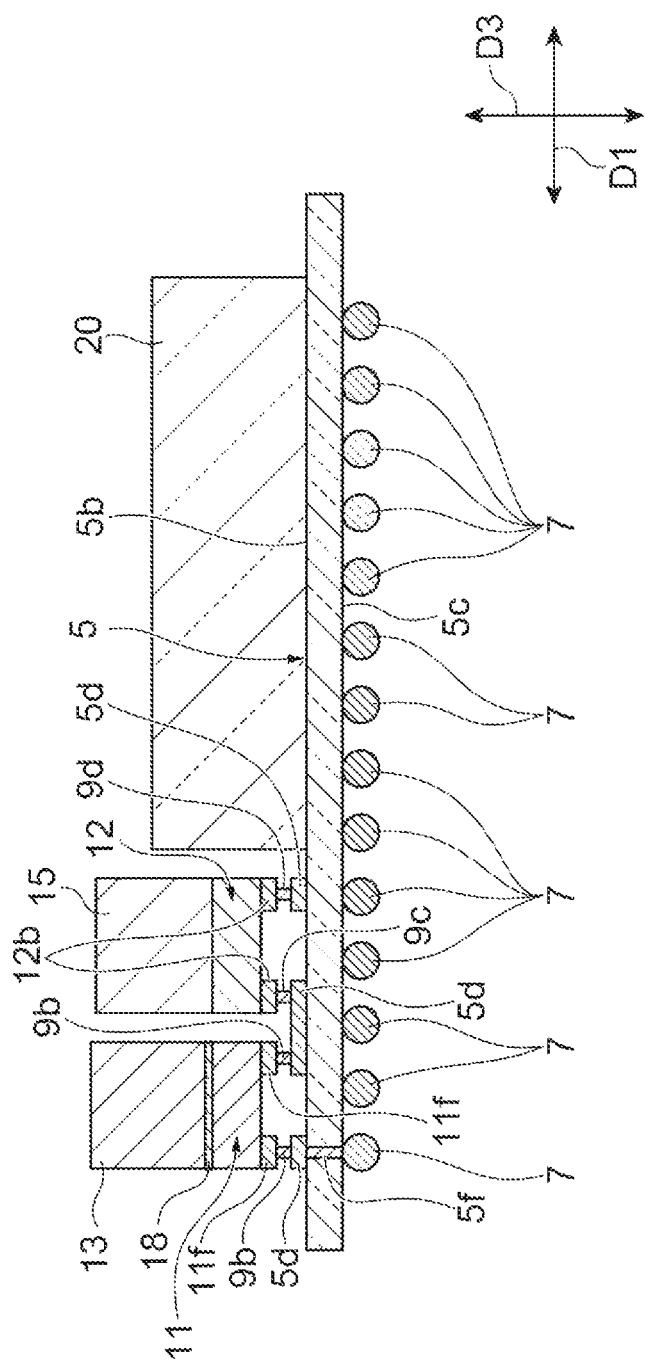
FIG. 5 is a view illustrating a process of the method of manufacturing the optical module according to the embodiment.

As illustrated in FIG. 5, the optical component 20 is mounted on the second face 5b of the lid 5 (the process of mounting the optical component). The mounting is performed so that the optical modulator 12 is optically coupled with the optical component 20 and the optical component 20 is optically coupled with the optical connector 3. The optical connector 3 is, for example, a cylindrical sleeve that holds the optical fiber in the center. The end face of the optical fiber is exposed to the internal space 2A. More specifically, the optical input/output port of the optical modulator 12, which is the end face of the optical waveguide formed in the optical modulator 12, is optically aligned, and the optical component 20 is fixed to the second face 5b with a resin (the process of fixing the optical component with a resin). In the optical alignment, for example, the alignment of a lens that converts an output light from the optical modulator 12 into a collimated light, the alignment of a lens that couples the collimated light generated inside the optical component 20 to a waveguide end face of the optical modulator 12, the mounting of a mirror on the lid 5, and the like are performed.

Figure 6:
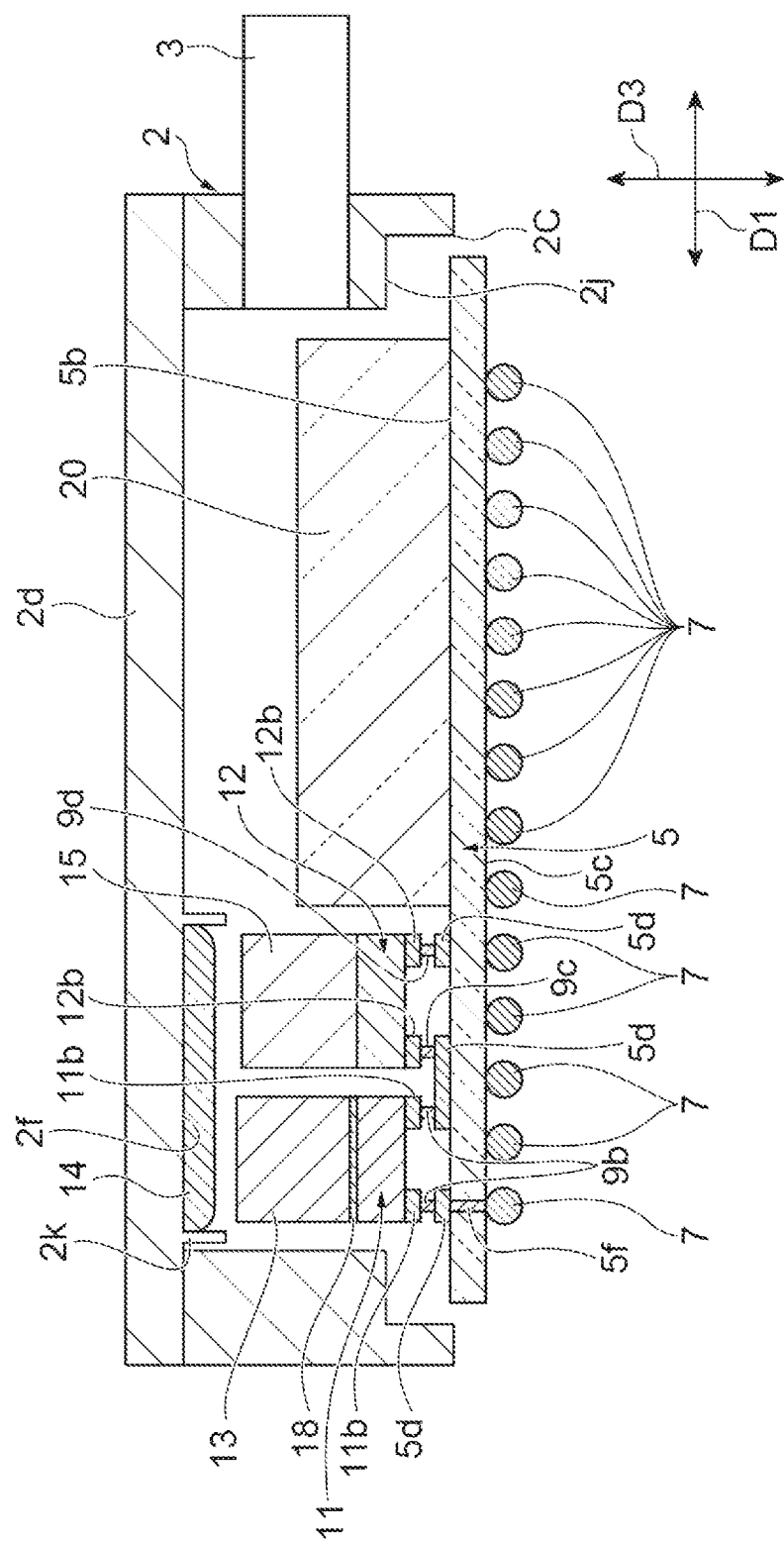
FIG. 6 is a view illustrating a process of the method of manufacturing the optical module according to the embodiment.
Figure 7:
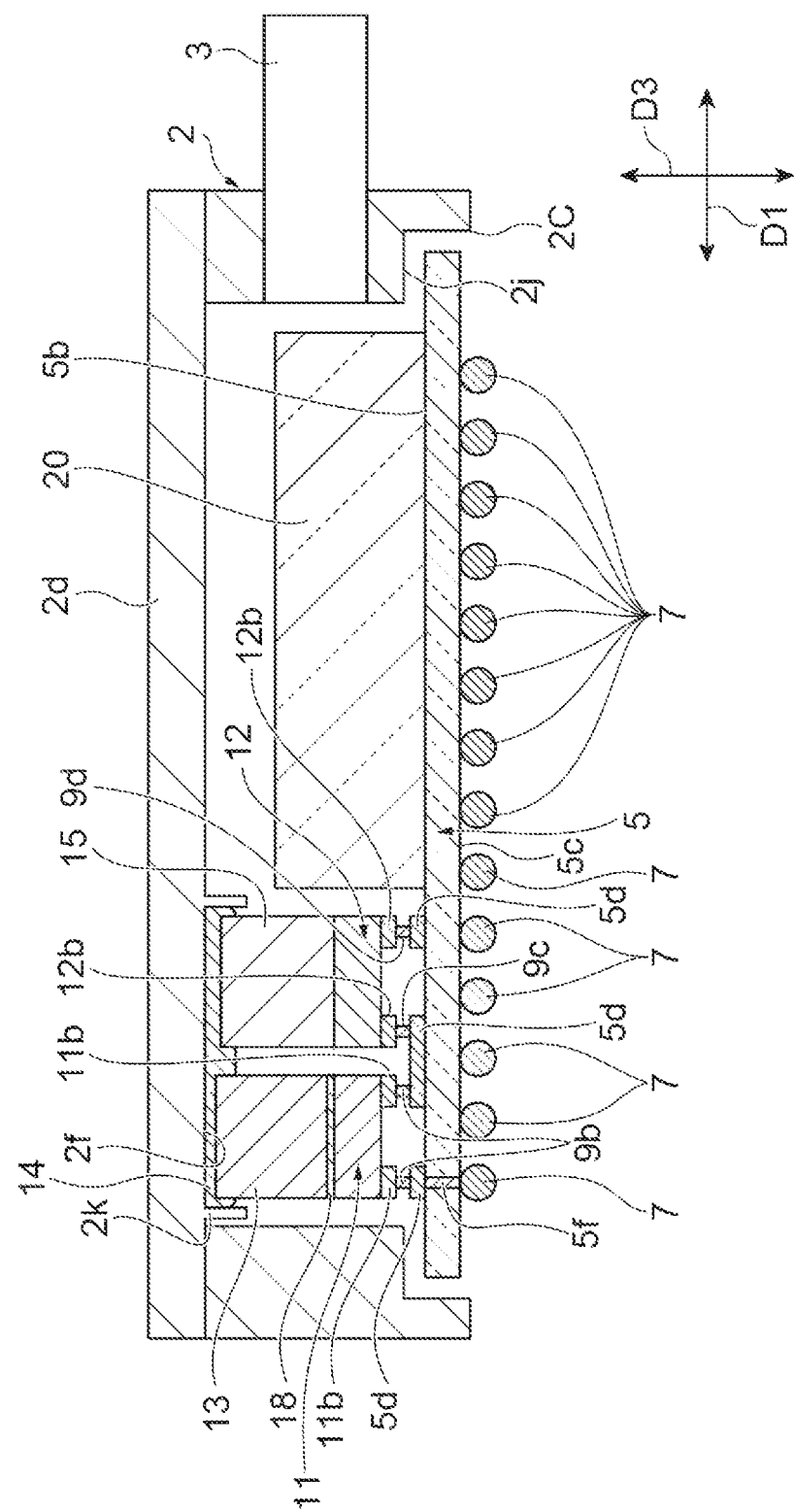
FIG. 7 is a view illustrating a process of the method of manufacturing the optical module according to the embodiment.

As illustrated in FIG. 6, the second adhesive 14 is applied to the portion of the third face 2f inside the enclosure 2k (the process of applying the second adhesive). Then, the lid 5 on which the driver IC 11, the optical modulator 12 and the optical component 20 are mounted is accommodated in the recess 2j of the housing 2. It is noted that, at this time, the housing 2 is arranged on an assembly jig or the like (not illustrated) so that the third face 2f faces upward, and the lid 5 on which the driver IC 11, the optical modulator 12, and the optical component 20 are mounted is approximated so that the first face 5c from above faces upward. As illustrated in FIG. 7, the first block 13 and the TEC 15 are pressed against the second adhesive 14 to bond the third face 2f of the housing 2 to the first block 13 and the TEC 15 (process of bonding to the third face of the housing). At this time, confirming the state of bonding between the first block 13 and the TEC 15 and the third face 2f of the housing 2 by the second adhesive 14 with a visible light passing through the lid 5 (process of confirming the bonding state) may be performed.

The total thickness of the thickness of the driver IC 11 (length along the direction D3), the thickness of the first block 13 (length along the direction D3), and the thickness of the cured first adhesive 18 is varied due to the variation in manufacturing each portion (manufacturing variation). The coating thickness of the second adhesive 14 is determined in consideration of variations between the total thickness after soldering and bonding the optical modulator 12 and the TEC 15 connected with a gold-tin solder or the like and the total thickness after bonding the driver IC 11 bonded by the first adhesive 18 described above and the first heat radiation block 13. For example, the thickness variation of the TEC 15 which is configured with a plurality of members is the largest and has a maximum manufacturing variation of about +/−150 μm including the bonding thickness of the gold-tin solder. On the other hand, the total thickness variation of the driver IC 11 and the first block 13 bonded by the first adhesive 18 becomes a maximum variation of about +/−100 μm. Therefore, when the dimensions of the first block 13 and the recess 2j of the housing 2 are designed so that the average value of the respective total thicknesses is the same, by applying the second adhesive 14 with a thickness of more than 300 μm, the first block 13 and the TEC 15 can always be bonded to the third face 2f by the second adhesive 14 in contrast with the manufacturing variation. Accordingly, the heat generated by the driver IC 11 and the TEC 15 can be reliably radiated through the third face 2f of the housing 2. In addition, at the same time, the lid 5 is accommodated in the recess 2j of the housing 2, so that the housing 2 can be hermetically sealed with the sealing material 6.

Figure 8:
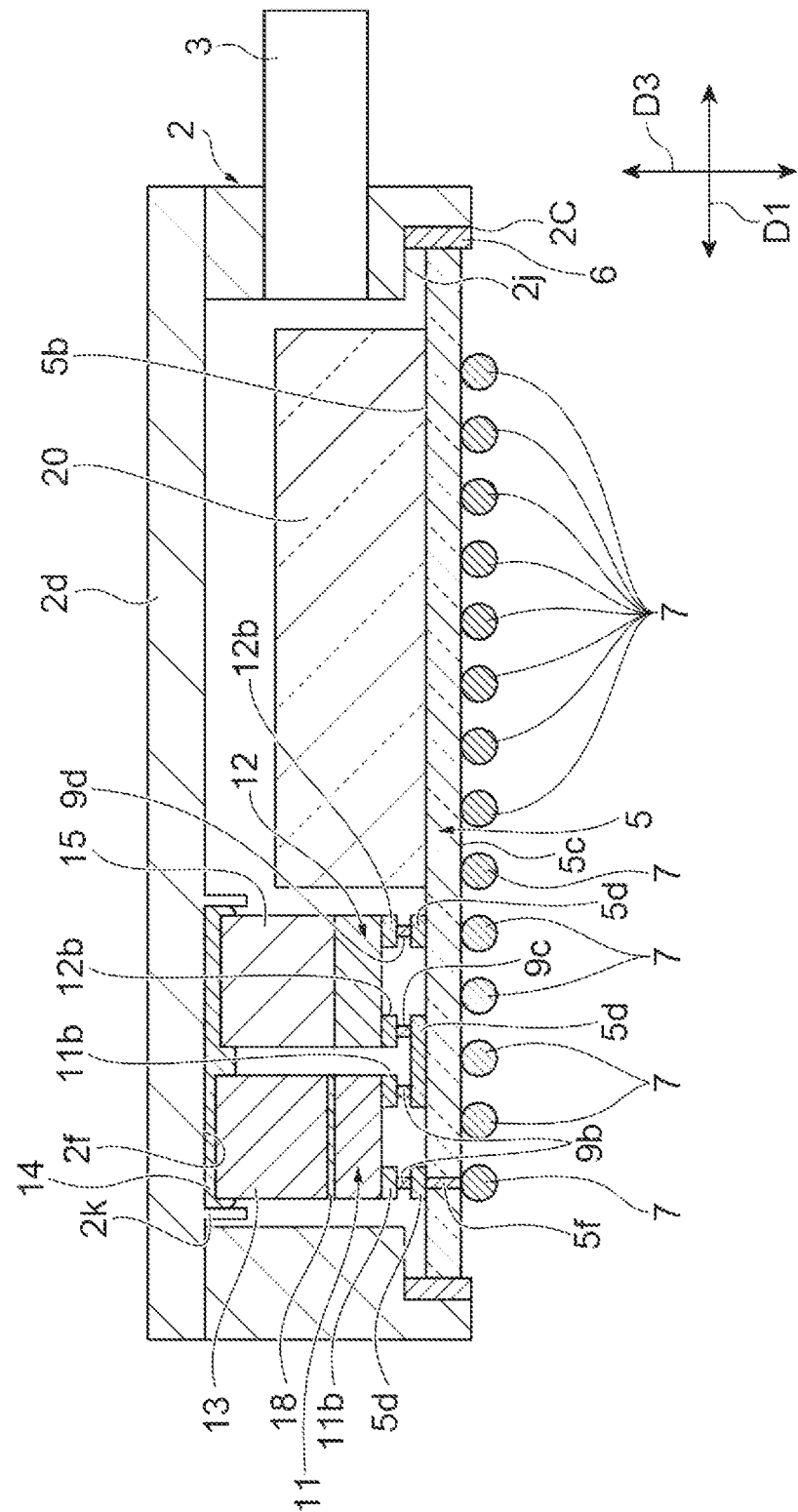
FIG. 8 is a view illustrating a process of the method of manufacturing the optical module according to the embodiment.

In addition, the optical connector 3 is aligned with the optical component 20 so that the collimated light generated inside the optical component 20 is optically coupled to the optical connector 3 (as a specific example, the end face of the optical fiber held by the stub of the optical connector 3), and the optical connector 3 is fixed to the housing 2 (the process of fixing the optical connector). A condenser lens may be placed between the optical component 20 and the optical connector 3 for the optical coupling. It is noted that, at this time, for example, hermetic sealing is performed so as not to create a gap between the periphery of the portion of the optical connector 3 that penetrates the housing 2 and the housing 2 after alignment. As illustrated in FIG. 8, the housing 2 is sealed by inserting the sealing material 6 between the housing 2 and the lid 5 accommodated in the recess 2j of the housing 2 (the process of hermetically sealing the housing). A series of processes is then completed.

Figure 10:
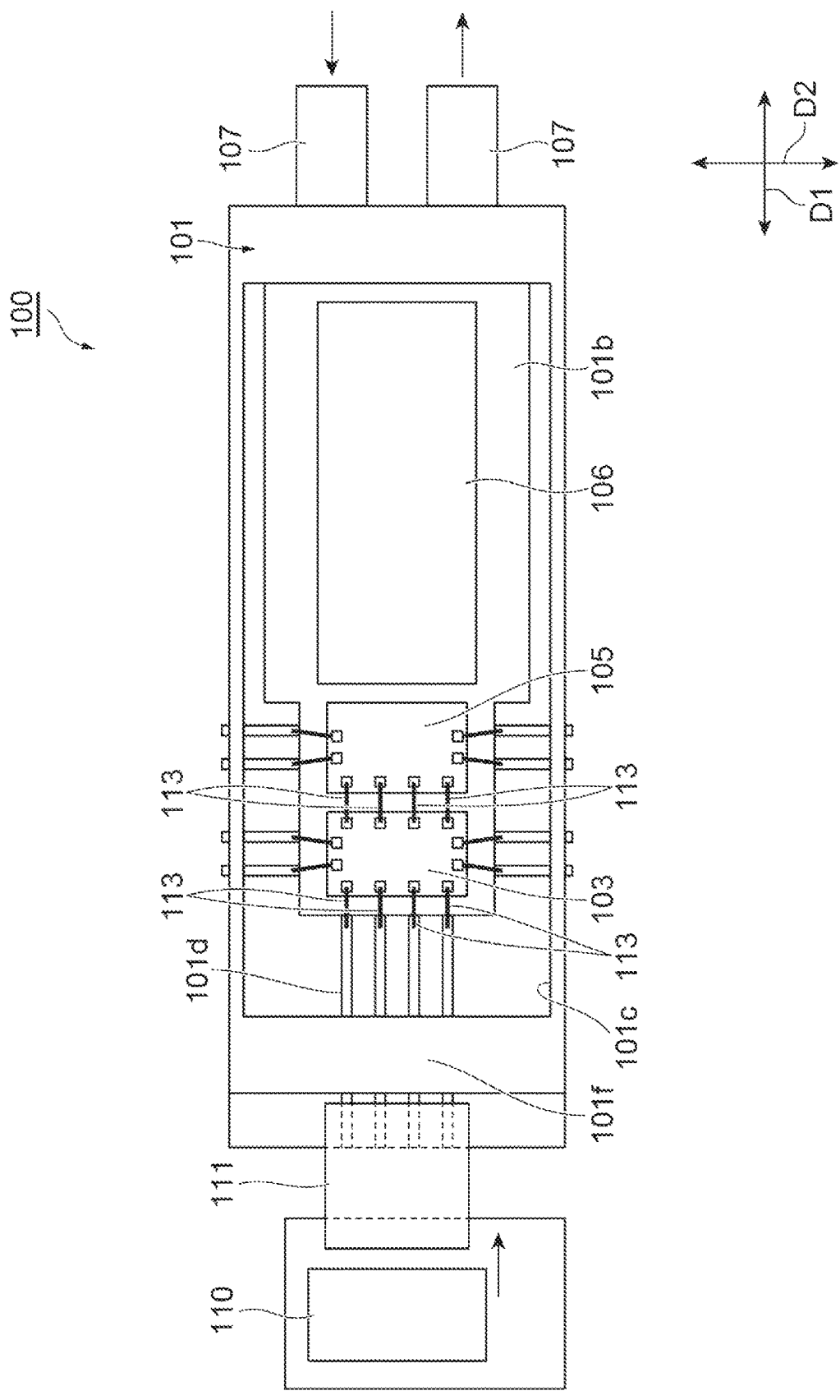
FIG. 10 is a plan view illustrating an internal structure of an optical module according to a reference example.
Figure 11:
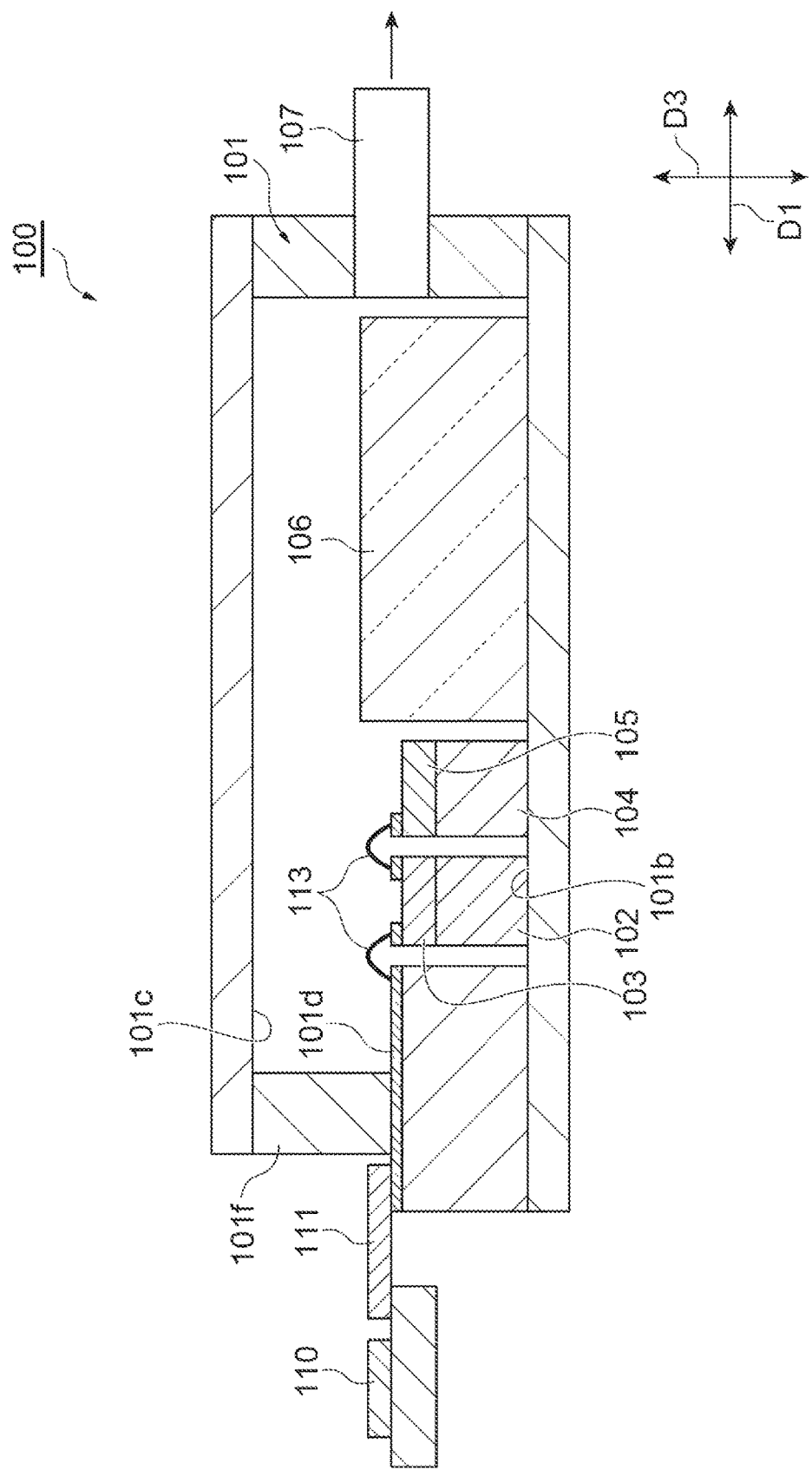
FIG. 11 is a longitudinal sectional view of the optical module according to the reference example.

Next, the functions and effects obtained from the optical module 1 and the method of manufacturing the optical module according to the embodiment will be described. First, an optical transmitter module 100 according to a reference example will be described with reference to FIGS. 10 and 11. As illustrated in FIGS. 10 and 11, the optical transmitter module 100 includes a housing 101, a driver IC 103, and an optical modulator 105. The driver IC 103 is fixed to an inner face 101b of the housing 101 with a block 102 sandwiched therebetween. The optical modulator 105 is fixed to the inner face 101b with a TEC 104 sandwiched therebetween. The optical transmitter module 100 further includes an optical component 106 inputting/outputting an optical signal to/from the optical modulator 105 and an optical connector 107 inputting/outputting the optical signal between the optical component 106 and the outside of the housing 101.

The optical transmitter module 100 performs electrical connection to a signal source IC 110 located outside the optical transmitter module 100 through an FPC (Flexible Printed Circuit) 111. The high-speed electrical signal is transmitted from the signal source IC 110 to the optical transmitter module 100 through the FPC 111. The optical transmitter module 100 uses a ceramic housing 101. The housing 101 has an interior space 101c and a feedthrough 101d, and the feedthrough 101d penetrates a wall 101f of the housing 101. The electrical signal transmitted from the signal source IC by the FPC 111 is supplied to the internal space 101c of the optical transmitter module 100 through the feedthrough 101d. It is noted that electrical wiring for power supply, ground and the like is also configured by the feedthrough 101d. A length of a signal transmission line of the high-speed electrical signal from the signal source IC 110 to the internal space 101c is relatively long, and thus, there occur a problem in that, the higher the speed of the electrical signal, the larger the deterioration of the electrical signal.

Inside the optical transmitter module 100, the driver IC 103 and the housing 101 are electrically connected to each other by a bonding wire 113. In addition, the driver IC 103 and the optical modulator 105 are electrically connected with the bonding wire 113. Wire bonding has parasitic inductance, and as the speed of the electrical signals is increased, the loss of high-frequency components is increased, and there is concern that the frequency characteristics of the signal transmission may be limited. In particular, when the electrical signal has a frequency component of 50 GHz or more, a sufficient bandwidth to pass the electrical signal cannot be obtained.

In contrast, in the optical module 1 and the method of manufacturing the optical module according to the embodiment, the first block 13 and the TEC 15 are bonded to the third face 2f of the housing 2. The driver IC 11 is bonded to the first block 13 by the first adhesive 18, and the optical modulator 12 is bonded to the TEC 15. The driver IC 11 and the optical modulator 12 are mounted on the second face 5b of the lid 5, and the bumps 7 for supplying the electrical signals from the circuit board 8 to the lid 5 are fixed to the first face 5c of the lid 5 facing the outside of the housing 2. Accordingly, the driver IC 11 is fixed to the second face 5b of the lid 5, and the bumps 7 are fixed to the first face 5c of the lid 5. The electrical signals are transmitted from the circuit board 8 to the second surface 5b through the bumps 7 and through-vias 5h of the lid 5. Therefore, since a length of signal path of a high-speed electrical signal can be shortened, so that electrical loss of the high-speed electrical signal can be reduced. Therefore, the frequency characteristics of the signal transmission can be improved. In addition, the bumps 7 may be bumps having a diameter of 300 μm or less, and by connecting the circuit board (interposer) on which a finer circuit pattern is formed and the lid 5, the effect of the parasitic capacitance of the solder balls can be reduced, and the electrical signals having frequency components exceeding 50 GHz can be transmitted favorably.

The lid 5 may contain a glass as a base material. In the case, the heat resistance of the lid 5 can be increased. Accordingly, for example, the heat inflows into the optical modulator 12 from the outside through the lid 5 can be reduced, and the efficiency of the temperature control by the TEC 15 can be improved.

The second adhesive 14 may have a thickness larger than a thickness of the first adhesive 18. Accordingly, for example, a thickness of the first block 13 and the TEC 15 can be reliably bonded to a third face 2f of the housing 2 in contrast with manufacturing variation in the thickness of the first block 13 or the thickness of the TEC 15.

The housing 2 may have the heat radiation plate 2d, and the heat radiation plate 2d may have the third face 2f. In the case, a heat radiation path from each of the first heat radiation block 13 and the TEC 15 to the heat radiation plate 2d can be secured, and the heat radiation performance of the driver IC 11 and the TEC 15 can be further enhanced.

The third face 2f of the housing 2 and the second face 5b of the lid 5 may be arranged opposite to each other with respect to the driver IC 11. Accordingly, an electrical signal path between the circuit board 8 and the driver IC 11 and a heat radiation path between the heat radiation plate 2d of the housing 2 and the driver IC 11 can be provided separately.

The heat radiation plate 2d may have the enclosure 2k for accommodating the second adhesive 14 in the third face 2f. In the case, when the first block 13 and the TEC 15 are pressed against the second adhesive 14 applied to the third face 2f of the housing 2, the leakage of the second adhesive 14 to the periphery of along the direction D1 and the direction D2 is suppressed by the enclosure 2k.

Figure 9:
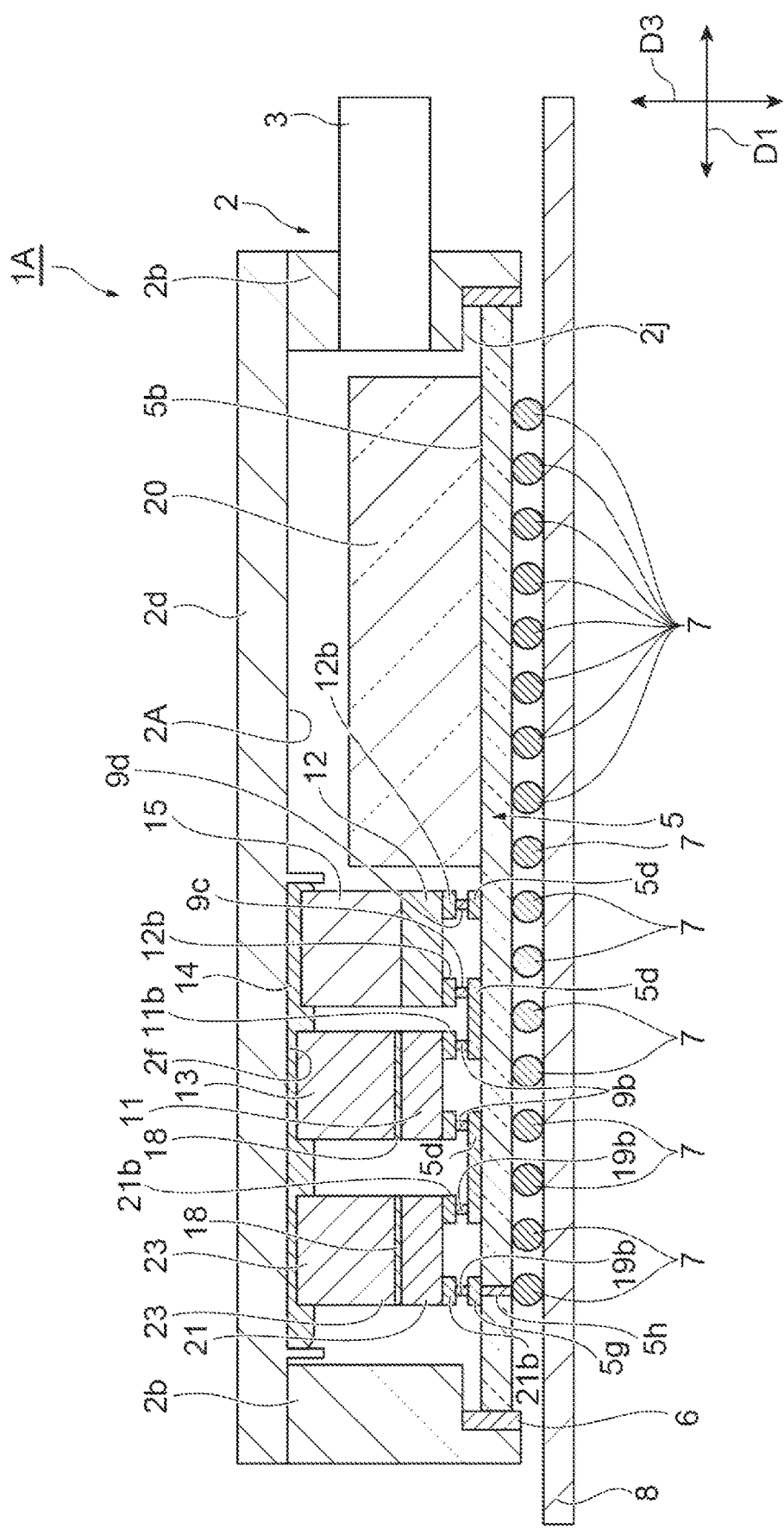
FIG. 9 is a longitudinal sectional view of an optical module according to Modified Example.

Next, an optical module 1A according to Modified Example will be described with reference to FIG. 9. FIG. 9 is a longitudinal sectional view of the optical module 1A. A portion of the configuration of the optical module 1A is the same as a portion of the configuration of the optical module 1 described above. Therefore, in the following description, the portions that overlap with the configuration of the optical module 1 are denoted by the same reference numerals, and the description thereof will be omitted as appropriate.

The optical module 1A further includes a signal source IC 21 (second IC) and a second block 23. The second block 23 is adhered to the signal source IC 21 by the first adhesive 18. The total thickness of the thickness of the signal source IC 21 (length along the direction D3), the thickness of the second heat radiation block 23 (length along the direction D3), and the thickness of the cured first adhesive 18 sandwiched between these components and the total thickness of the thickness of the driver IC 11 (length along the direction D3), the thickness of the first heat radiation block 13 (length along the direction D3), and the thickness of the cured first thermally conductive adhesive 18 sandwiched between these components vary due to the respective manufacturing variation. The applying thickness of the second adhesive 14 is determined in consideration of the variation among the total thickness (including the thickness of the cured gold-tin solder) after the bonding of the optical modulator 12 and the TEC 15 connected with a gold-tin solder or the like, the total thickness after the bonding of the driver IC 11 and the first block 13 bonded by the first adhesive 18 described above, and the total thickness after the bonding of the signal source IC 21 and the second heat radiation block 23 bonded by the first thermally conductive adhesive 18 described above. For example, the thickness variation of the TEC 15, which is configured with a plurality of members, is the largest, and has a maximum manufacturing variation of about +/−150 μm. On the other hand, the total thickness of the driver IC 11 and the first block 13 bonded by the first adhesive 18, and the total thickness of the signal source IC 21 and the second heat radiation block 23 have a maximum variation of about +/−100 μm. Therefore, like the average values of the respective thicknesses, when the dimensions of the first block 13 and the second block 23 and the recess 2j of the housing 2 are designed, by applying the thickness of the second adhesive 14 as a thickness of more than 300 μm, the first block 13, the second block 23, and the TEC 15 can always be bonded to the third face 2f by the second adhesive 14 with respect to the manufacturing variation. Accordingly, the heat generated by the driver IC 11, the signal source IC 21 and the TEC 15 can be reliably radiated through the third face 2f of the housing 2. In addition, at the same time, the lid 5 is accommodated in the recess 2*j* of the housing 2 and hermetically sealed by the sealing material 6.

The signal source IC 21 is bonded to the second block 23 by, for example, the first adhesive 18. The signal source IC 21 has, for example, a function (multiplexing function) of multiplexing the low-speed electrical signals (parallel signals) to generate the high-speed electrical signals (serial signals). For example, by the multiplexing function, four mutually independent electrical signals (parallel signals) with a communication speed of 12.5 Gbit/s are multiplexed to generate one electrical signal (serial signal) with a communication speed of 50 Gbit/s. The parallel signals have a communication speed that is lower than the communication speed of the serial signals. The second block 23 is bonded to the third face 2*f* of the housing 2 by the second adhesive 14. The signal source IC 21 is mounted on the second face 5*b* of the lid 5 by flip-chip assembly. More specifically, the circuit face of the signal source IC 21 is connected to the second face 5*b*. Furthermore, the second block 23 is adhered to the board face of the signal source IC 21. As will be described later, the signal source IC 21 is electrically connected to the optical modulator 12 through the driver IC 11. The signal source IC 21 has a plurality of wirings 21*b* facing the lid 5. The lid 5 has wirings 5*g* facing the signal source IC 21 and the through-vias 5*h* extending from the wirings 5*g* in the direction D3.

The wirings 21*b* are electrically connected to the bumps 7 through bumps 19*b*, the wirings 5*g*, and the through-vias 5*h*. In addition, for example, the bumps 19*b*, the bumps 9*b*, and the wirings 5*d* connected to these bumps constitute the signal wirings transmitting the serial signals. In addition, the bumps 9*b*, the bumps 9*c*, and the wirings 5*d* connected to these bumps constitute the signal wirings for transmitting the electrical signals (driving signals) driving the optical modulator 12. For example, the bumps 7, the through-vias 5*h*, the wirings 5*g*, the bumps 19*b*, and the wirings 21*b* constitute parallel signal wirings transmitting parallel signals. Accordingly, the plurality of parallel signals are supplied from the circuit board 8 to the signal source IC 21 through the bumps 7 and the through-vias 5*h*. A serial signal generated by multiplexing from the plurality of parallel signals is supplied from the signal source IC 21 to the driver IC 11 through the bumps 19*b*, the wirings 5*d* of the lid 5 and the bumps 9*b*. Thus, the serial signal generated by the signal source IC 21 is supplied to the driver IC 11. The driver IC 11 supplies the drive signals to the optical modulator 12 through the bumps 9*b*, the wirings 5*d*, and the bumps 9*c*. It is preferable that each of the signal wiring for transmitting the serial signal and the signal wiring for transmitting the drive signal constitute the transmission line. These transmission lines have a predetermined characteristic impedance for impedance matching. These transmission lines may, for example, constitute the GSSG wiring described above.

As described above, the optical module 1A according to Modified Example further includes the signal source IC 21 mounted on the second face 5*b* by flip-chip assembly. The signal source IC 21 is electrically connected to the optical modulator 12 through the driver IC 11, and the signal source IC 21 is connected to the second block 23. The second block 23 is bonded to the third face 2*f* by the second adhesive 14. By accommodating the signal source IC 21 having the multiplexing function in the internal space 2A of the housing 2 in this manner, transmission of the high-speed electrical signals (serial signals) between the circuit board 8 and the optical module 1 can be eliminated. Therefore, the deterioration of the frequency characteristics of the signal transmission due to loss or impedance mismatch caused by the high-speed electrical signal passing through the bumps 7 and the through-vias 5*h* can be avoided. Therefore, inside the internal space 2A of the housing 2, the signal source IC 21, the driver IC 11, and the optical modulator 12 are connected to each other with the transmission line formed on the lid 5, so that the deterioration of the frequency characteristics of the signal transmission of the high-speed electrical signal transmitted from the signal source IC 21 to the optical modulator 12 can be more reliably suppressed. Moreover, since a relatively low-speed signal such as a parallel signal may be transmitted to the bumps 7, there is no need to use small-diameter bumps, and the circuit board 8 which is easy to manufacture and is inexpensive can be used. In addition, for example, an electric connector (for example, PGA; Pin Grid Array) instead of BGA can be used for connecting the bumps 7 and the circuit board, and the mounting and maintenance of the optical module 1A can be facilitated.

The embodiments and modified examples according to the present disclosure have been described above. However, the present invention is not limited to the above-described embodiments or modified examples, and can be changed as appropriate within the scope of spirit of the claims For example, in the above-described embodiments, the optical module 1, which is an optical transmitter module, has been described. However, the optical module may not be an optical transmitter module, but may be, for example, an optical receiver module. For example, in the optical receiver module, in the configuration of FIG. 2, a trans-impedance amplifier IC (TIA) may be used instead of the driver IC 11, a light reception element PD may be used instead of the optical modulator 12, and a second block may be used instead of the TEC 15. With such a configuration, a received signal (for example, photocurrent) generated by the light reception element PD can be transmitted to the TIA through the transmission line configured with the wirings 5*d* of the lid 5. The parasitic inductance can be reduced by the wirings 5*d* formed on the lid 5 compared to the connection by bonding wires, and the frequency characteristics of the received signal can be improved.

In the optical receiver module, the first block and the second block described above may be made of an insulating material. In addition, the first adhesive and the second adhesive may each have an insulating property. Furthermore, a signal processing IC having a demultiplexing function contrary to a multiplexing function may be used instead of the signal source IC 21 in the configuration of FIG. 2. Accordingly, the electrical signal generated from the received signal is transmitted through the wirings 5*d* of the lid 5 among the light reception element, the TIA, and the signal processing IC accommodated in the internal space 2A of the housing 2, and the plurality of parallel signals generated from the serial signals by the signal processing IC are transmitted to the circuit board 8 through the through-vias 5*h* and the bumps 7. With such a configuration, the deterioration of the frequency characteristics of the signal transmission due to loss or impedance mismatch caused by the high-speed electrical signals passing through the bumps 7 and the through-vias 5*h* can be avoided.

What is claimed is:
1. An optical module comprising:
a lid having a first face and a second face opposite to the first face, the lid including a bump, a wiring, and a through via, the bump being formed on the first face, the wiring being formed on the second face, the through via being configured to electrically connect the first face to the second face;

an optical circuit element mounted on the second face by flip-chip assembly;
a first integrated circuit (IC) mounted on the second face by flip-chip assembly, the first IC being electrically connected to the optical circuit element through the wiring and electrically connected to the bump through the through via;
a first block bonded to the first IC by a first adhesive;
a temperature control element bonded to the optical circuit element; and
a housing having an opening and a third face provided inside the opening, the housing being configured to house the first IC, the optical circuit element, the first block, and the temperature control element, the third face being bonded to the first block and the temperature control element by a second adhesive, the housing being hermetically sealed with the lid.

2. The optical module according to claim 1, wherein the lid includes glass as a base material.

3. The optical module according to claim 1, wherein the second adhesive has a thickness larger than a thickness of the first adhesive.

4. The optical module according to claim 1, wherein the housing includes a heat radiation member and the third face is provided on the heat radiation member.

5. The optical module according to claim 4, wherein the third face is configured to face the second face inside the opening.

6. The optical module according to claim 4, wherein the heat radiation member has a fence on the third face, the fence being configured to hold the second adhesive inside the fence.

7. The optical module according to claim 1, further comprising a second IC and a second block,
wherein the second IC is mounted on the second face by flip-chip assembly and electrically connected between the through via and the first IC, and
wherein the third face is bonded to the second IC by the second adhesive.

8. A manufacturing method of an optical module comprising:
preparing a lid having a bump formed on a first face, a wiring formed on a second face opposite to the first face, a through via being configured to electrically connect the first face to the second face;
bonding a first integrated circuit (IC) to a first block by a first adhesive;
mounting an optical circuit element to a temperature control element;
mounting the first IC and the temperature control element on the second face by flip-chip assembly, electrically connecting the first IC to the optical circuit element through the wiring, and electrically connecting the first IC to the bump through the through via;
applying the second adhesive on the second face provided inside an opening of a housing;
holding the first block, the first IC, the temperature control element, and the optical circuit element inside the opening, and bonding the third face of the housing to the first block and the temperature control element by the second adhesive; and
hermetically sealing the housing with the lid.

\* \* \* \* \*

UNITED STATES PATENT AND TRADEMARK OFFICE
CERTIFICATE OF CORRECTION

| | | |
|---|---|---|
| PATENT NO. | : 12,210,231 B2 | Page 1 of 1 |
| APPLICATION NO. | : 18/085634 | |
| DATED | : January 28, 2025 | |
| INVENTOR(S) | : Keiji Tanaka et al. | |

It is certified that error appears in the above-identified patent and that said Letters Patent is hereby corrected as shown below:

On the Title Page

Column 1, please add item (30):
--(30) Foreign Application Priority Data
December 22, 2021 (JP) .................................. 2021-208394--.

Signed and Sealed this
Twenty-second Day of April, 2025

Coke Morgan Stewart
*Acting Director of the United States Patent and Trademark Office*